US012266823B2

(12) United States Patent
Chi et al.

(10) Patent No.: US 12,266,823 B2
(45) Date of Patent: Apr. 1, 2025

(54) BATTERY MODULE AND MANUFACTURING METHOD THEREOF

(71) Applicant: LG Energy Solution, Ltd., Seoul (KR)

(72) Inventors: Ho June Chi, Daejeon (KR); Jeong Oh Moon, Daejeon (KR); Kyung Mo Kim, Daejeon (KR); Heejun Jin, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 725 days.

(21) Appl. No.: 17/437,697

(22) PCT Filed: Mar. 13, 2020

(86) PCT No.: PCT/KR2020/003534
§ 371 (c)(1),
(2) Date: Sep. 9, 2021

(87) PCT Pub. No.: WO2020/189975
PCT Pub. Date: Sep. 24, 2020

(65) Prior Publication Data
US 2022/0158308 A1    May 19, 2022

(30) Foreign Application Priority Data
Mar. 15, 2019 (KR) .......................... 10-2019-0030176

(51) Int. Cl.
*H01M 50/505* (2021.01)
*H01M 50/178* (2021.01)
(Continued)

(52) U.S. Cl.
CPC ....... *H01M 50/505* (2021.01); *H01M 50/178* (2021.01); *H01M 50/204* (2021.01);
(Continued)

(58) Field of Classification Search
CPC ........... H01M 10/0404; H01M 50/503; H01M 50/505; H01M 50/507; H01M 50/517;
(Continued)

(56) References Cited

U.S. PATENT DOCUMENTS

| 2010/0055993 A1 | 3/2010 | Ikeda et al. |
| 2014/0248517 A1* | 9/2014 | Yoshioka ............ H01M 50/519 429/90 |

(Continued)

FOREIGN PATENT DOCUMENTS

| CN | 103931018 A | 7/2014 |
| JP | 2004255490 A | 9/2004 |

(Continued)

OTHER PUBLICATIONS

Extended European Search Report for Application No. 20774165.3 dated Mar. 7, 2022. 8 pgs.

(Continued)

Primary Examiner — Matthew W Van Oudenaren
(74) Attorney, Agent, or Firm — Lerner David LLP (57) ABSTRACT

The present disclosure relates to a battery module including a busbar structure for adhesion with an electrode lead. The battery module can include a battery cell stack having a plurality of stacked battery cells, electrode leads protruding from the battery cell stack, a busbar electrically connected to the electrode leads, and a busbar frame on which the busbar is mounted. The busbar can be formed of a tongs part and a fixing part for connecting and fixing the tongs part. The electrode leads can be mounted between the tongs part of the busbar. The battery module can be manufactured through the steps of mounting a busbar in an opening part of a busbar frame, inserting an electrode lead between the tongs part of the busbar, closely adhering the busbar and the electrode lead through a jig, and removing the jig.

9 Claims, 6 Drawing Sheets

(51) Int. Cl.
*H01M 50/204* (2021.01)
*H01M 50/50* (2021.01)
*H01M 50/516* (2021.01)
*H01M 50/528* (2021.01)
*H01M 50/553* (2021.01)
*H01M 50/567* (2021.01)

(52) U.S. Cl.
CPC ......... *H01M 50/50* (2021.01); *H01M 50/516* (2021.01); *H01M 50/528* (2021.01); *H01M 50/553* (2021.01); *H01M 50/567* (2021.01)

(58) Field of Classification Search
CPC .. H01M 50/528; H01M 50/548; H01M 50/55; H01M 50/553
See application file for complete search history.

(56) References Cited

U.S. PATENT DOCUMENTS

| | | |
|---|---|---|
| 2015/0037616 A1 | 2/2015 | Wyatt et al. |
| 2015/0311484 A1 | 10/2015 | Katayama et al. |
| 2015/0318626 A1* | 11/2015 | Nakayama ............ H01R 11/11 439/627 |
| 2017/0352852 A1 | 12/2017 | Son et al. |
| 2018/0159096 A1 | 6/2018 | Kim et al. |
| 2018/0294448 A1 | 10/2018 | Yamane et al. |
| 2019/0386283 A1 | 12/2019 | Lee et al. |
| 2020/0381691 A1 | 12/2020 | Chi et al. |

FOREIGN PATENT DOCUMENTS

| | | |
|---|---|---|
| JP | 2010055885 A | 3/2010 |
| JP | 2011119075 A | 6/2011 |
| JP | 4757508 B2 | 8/2011 |
| JP | 2013105700 A | 5/2013 |
| JP | 2014060033 A | 4/2014 |
| JP | 2015002073 A | 1/2015 |
| JP | 201769168 A | 4/2017 |
| KR | 20140093424 A | 7/2014 |
| KR | 20150011861 * | 2/2015 |
| KR | 20150011861 A | 2/2015 |
| KR | 101509206 B1 | 4/2015 |
| KR | 20170095072 A | 8/2017 |
| KR | 20170136275 A | 12/2017 |
| KR | 20180092064 A | 8/2018 |
| KR | 20180125796 A | 11/2018 |
| KR | 20180127760 A | 11/2018 |
| KR | 20180135702 A | 12/2018 |
| WO | 2017-082528 A1 | 5/2017 |
| WO | 2018216872 A1 | 11/2018 |
| WO | 2019050173 A1 | 3/2019 |

OTHER PUBLICATIONS

International Search Report for PCT/KR2020/003534 mailed Jun. 30, 2020; 3 pages.
Search Report dated Nov. 30, 2022 from the Office Action for Chinese Application No. 202080021026.8 issued Dec. 12, 2022, pp. 1-3. [See p. 1, categorizing the cited references].

* cited by examiner

[FIG. 1]

[PRIOR ART]

BATTERY MODULE AND MANUFACTURING METHOD THEREOF

CROSS-REFERENCE TO RELATED APPLICATIONS

This application is a national phase entry under 35 U.S.C. § 371 of International Application No. PCT/KR2020/003534 filed on Mar. 13, 2020, which claims the benefit of Korean Patent Application No. 10-2019-0030176 filed on Mar. 15, 2019, with the Korean Intellectual Property Office, the disclosures of which are incorporated herein by reference in their entirety.

TECHNICAL FIELD

The present invention relates to a battery module and a method for manufacturing the same, and more particularly, to a battery module having a connection structure between an electrode lead and a busbar, and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it provides energy without generating by-products.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

The battery module can include a plurality of battery cells stacked together and a busbar electrically connecting electrode leads of the plurality of battery cells. For example, FIG. 1 (prior art) is a view showing a state in which an electrode lead in a conventional battery module is connected to a busbar.

Figure 1:
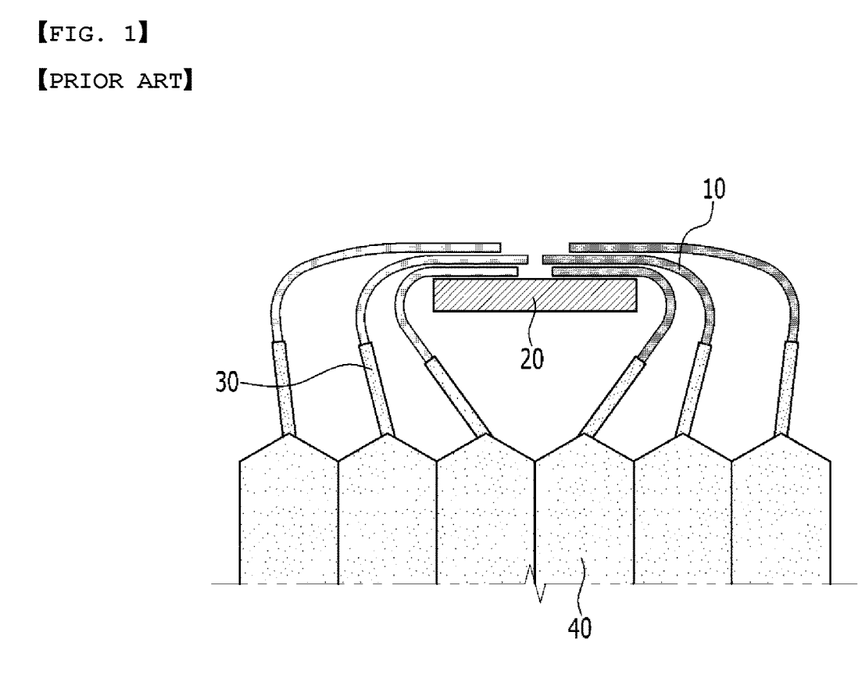
FIG. 1 is a view showing a state in which an electrode lead in a conventional battery module (prior art) is connected to a busbar.

Referring to FIG. 1, conventionally, after stacking battery cells to form a battery cell stack 40, the battery cell stack 40 is assembled with a busbar frame (not shown) mounted to a busbar 20, and electrode leads 10. The electrode leads are formed to protrude from the battery cell stack and are subjected to laser welding or the like with the busbar 20 mounted on the busbar frame to adhere the electrode lead 10 to the busbar 20.

However, as shown in FIG. 1, when assembling the battery cell stack 40 with the busbar 20, the electrode leads 10 connected to the battery cell stack 40 should be bent and adhered to the busbar. In the bending process, however, there is a problem that a spring-back phenomenon may occur, whereby a previously bent electrode lead is restored to its original shape by elasticity.

Furthermore, as shown in FIG. 1, when a plurality of electrode leads 10 are bent and adhered to the busbar 20 in a side-by-side configuration, the plurality of bent electrode leads 10 overlap when adhered to the busbar. In this case, due to the interaction of the spring-back phenomenon occurring between the electrode leads 10, and the varying positions of the ends of the electrode leads 10 due to bending, a gap between the electrode leads is created as shown in FIG. This is turn, causes a difference in the degree of welding adhesion on account of the varying distances between the electrode lead 10 and the busbar 20. Therefore, the adhesion strength between the electrode leads 10 and the busbar 20 is lowered, which may cause an abnormality in electrical connectivity.

In addition, the bending of the electrode leads 10 may have to be manually performed to mitigate or prevent damage of the electrode leads. Manual steps will likely decrease process automation speed and efficiency, and may compromise welding quality.

SUMMARY

Technical Problem

Therefore, it an object of the present disclosure to provide a battery module having a connection structure between a busbar and an electrode lead that can improve the processability and reliability of an electrical connection between the electrode lead and the busbar, and a manufacturing method for same.

Technical problems to be solved by the present disclosure are not limited to the aforementioned technical problem. Other technical problems, which are not mentioned above, may be clearly understood from the following descriptions by those skilled in the art to which the present disclosure pertains.

Technical Solution

According to an aspect of the present invention, there is provided a battery module including a battery cell stack in which a plurality of battery cells are stacked, electrode leads formed to protrude from the battery cell stack, a busbar electrically connected to the electrode leads, and a busbar frame on which the busbar is mounted. The busbar may include a tongs part and a fixing part for connecting and fixing to the tongs part. The electrode leads may be mounted between the tongs part of the busbar.

Continuing in accordance with this aspect, the busbar frame may include a lower opening part corresponding to the fixed part of the busbar, and a locking part corresponding to an end of the tongs part of the busbar.

Continuing in accordance with this aspect, the lower opening part may correspond to a structure in which the busbar frame is recessed.

Continuing in accordance with this aspect, the tongs part of the busbar may be formed of two clip parts extending from the fixing part. A distance between the two clip parts may decrease toward the fixing part.

Continuing in accordance with this aspect, the electrode leads may be in contact with the clip part at a portion closer to the fixing part than an end of the clip part.

Continuing in accordance with this aspect, the electrode leads may be formed to protrude in the shape of a flat plate.

Continuing in accordance with this aspect, the battery module may further include cell terraces respectively protruding from the battery cells adjacent to each other among the battery cells included in the battery cell stack. The electrode leads may be formed to protrude from the cell terraces.

Continuing in accordance with this aspect, the tongs part of the busbar may be in close contact with the flat surface of the electrode lead in a vertical direction.

A method for manufacturing a battery module is disclosed as an aspect of the present invention. A method according to this embodiment, may include the steps of mounting a busbar in an opening part of a busbar frame, inserting an electrode lead between a tongs part of the busbar, closely adhering the busbar and the electrode lead through a jig, and removing the jig.

Continuing with this aspect, the step of closely adhering the busbar and the electrode lead, the jig may be inserted between the busbar frame and the busbar to closely adhere the busbar and the electrode lead.

Advantageous Effects

In a battery module according to one embodiment of the present invention, an electrode lead of a flat plate is inserted into and mounted to a busbar such that the electrode lead and the busbar can be adhered without bending the electrode lead. Therefore, improved adhesion strength between the electrode lead and the busbar is achieved, which results in improved reliability of the electrical connection.

Further, in the battery module according to one embodiment of the present invention, since a manual operation process required for the bending operation is no longer necessary, the automated processing rate associated for production can be improved.

In addition, in the battery module according to one embodiment of the present invention, the busbar and the electrode lead are brought into close contact through a jig to ensure a stable electrical connection between the electrode lead and the busbar.

In addition, in the battery module according to one embodiment of the present invention, weight reduction of the busbar can be achieved through a thin clip-type busbar structure.

The effects of the present invention are not limited to the above-mentioned effects and further effects not described above will be clearly understood by those skilled in the art.

DETAILED DESCRIPTION should be appreciated that the exemplary embodiments described below, are illustratively described to help understand the present disclosure, and the present disclosure may be variously modified to be carried out differently from the exemplary embodiments described herein. However, in the description of the present disclosure, specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to one embodiment of the present invention will be described with reference to FIGS. 2 to 3.

Figure 2:
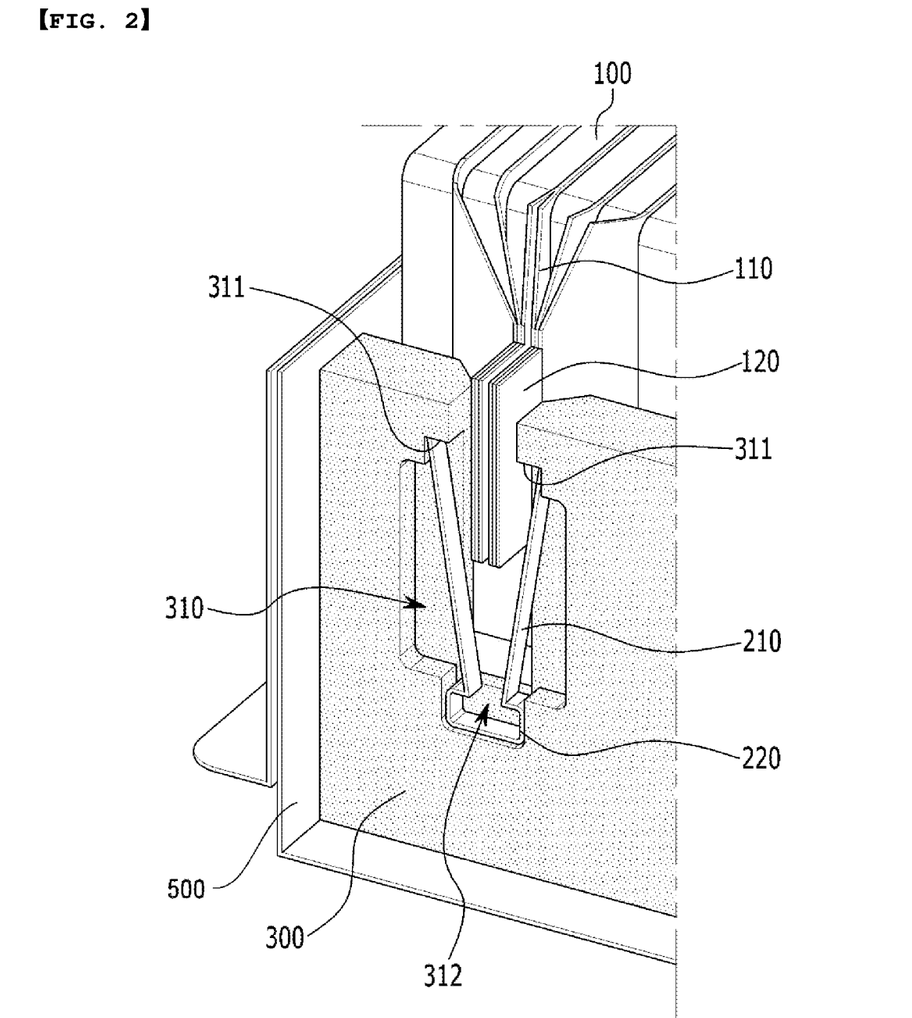
FIG. 2 is a perspective view showing a battery module according to one embodiment of the present invention.

FIG. 2 is a perspective view showing a battery module according to one embodiment of the present invention. FIG. 3 is a view showing a state in which an electrode lead of FIG. 2 is inserted into a busbar.

Figure 3:
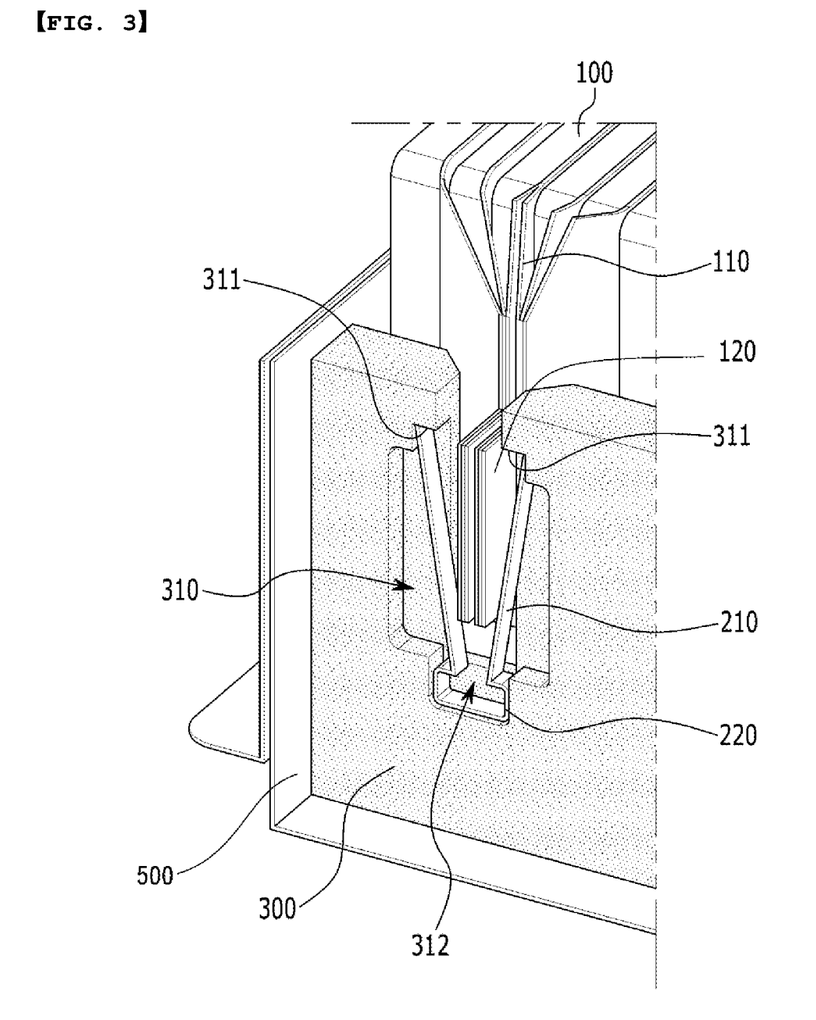
FIG. 3 is a view showing a state in which an electrode lead of FIG. 2 is inserted into a busbar.

Referring to FIGS. 2 and 3, a battery module according to one embodiment of the present invention includes a battery cell stack in which a plurality of battery cells 100 are stacked, electrode leads 120 formed to protrude from battery cells 100 included in the battery cell stack, a busbar 200 electrically connected to the electrode lead 120 (FIG. 5), and a busbar frame 300 on which the busbar 200 is mounted. The battery module further includes a frame member 500 surrounding the battery cell stack and the busbar frame 300.

The battery cells 100 is a secondary battery, and may be composed of a pouch-type secondary battery. A plurality of battery cells 100 may be stacked with each other so that they can be electrically connected to each other to form a battery cell stack.

Each of the plurality of battery cells 100 may include an electrode assembly, a battery case, and an electrode lead 120 protruding from the electrode assembly. The electrode assembly may include a positive electrode plate, a negative electrode plate, and a separator. The battery case is to package the electrode assembly, and may be made of a laminate sheet including a resin layer and a metal layer. The battery case may include a case body and a cell terrace 110. The electrode leads 120 may be electrically connected to the electrode assembly.

It should be noted that the configuration of the battery cells 100 described above is one embodiment of the present disclosure. In other embodiments, the type of battery cells 100 for configuring the battery cell stack may be variously modified.

The electrode leads 120 may be formed of a flat plate and protrude to at least one side of the battery cell 100. The electrode leads 120 may be stacked and can protrude in one direction allowing a series or parallel connection between the electrode leads 120. The electrode leads 120 may function as a battery terminal, and may be formed of a metal material such as copper or aluminum. In addition, the electrode leads 120 may be formed in varying thicknesses, and/or in varying widths. The thickness and/or width of the electrode leads 120 may be manufactured specifically according to the specifications of a secondary battery and a battery module.

The busbar 200 may be in contact with the electrode leads 120 and be electrically connected thereto. Similar to the electrode leads 120, the busbar 200 may be formed or an electrically conductive metal material, such as copper or aluminum, for electrical connection with the electrode leads 120.

Hereinafter, with reference to the battery module according to one embodiment of the present invention, a busbar frame, a busbar mounted thereon, and an electrode lead connected to the busbar will be described in detail with reference to FIGS. 2 to 5.

Figure 4:
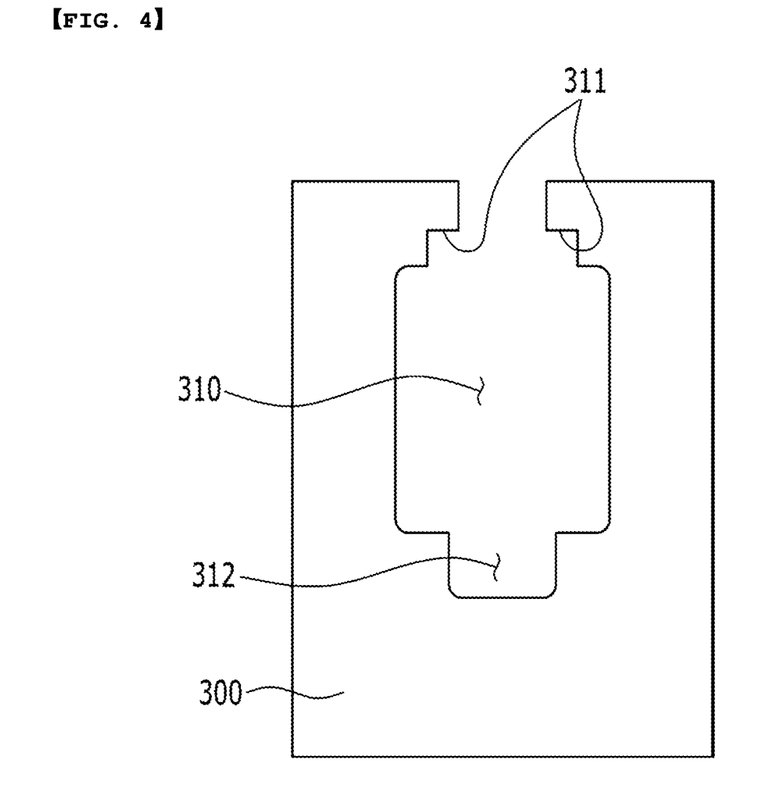
FIG. 4 is a cross-sectional view of a busbar frame of FIG. 3 as viewed from the front.
Figure 5:
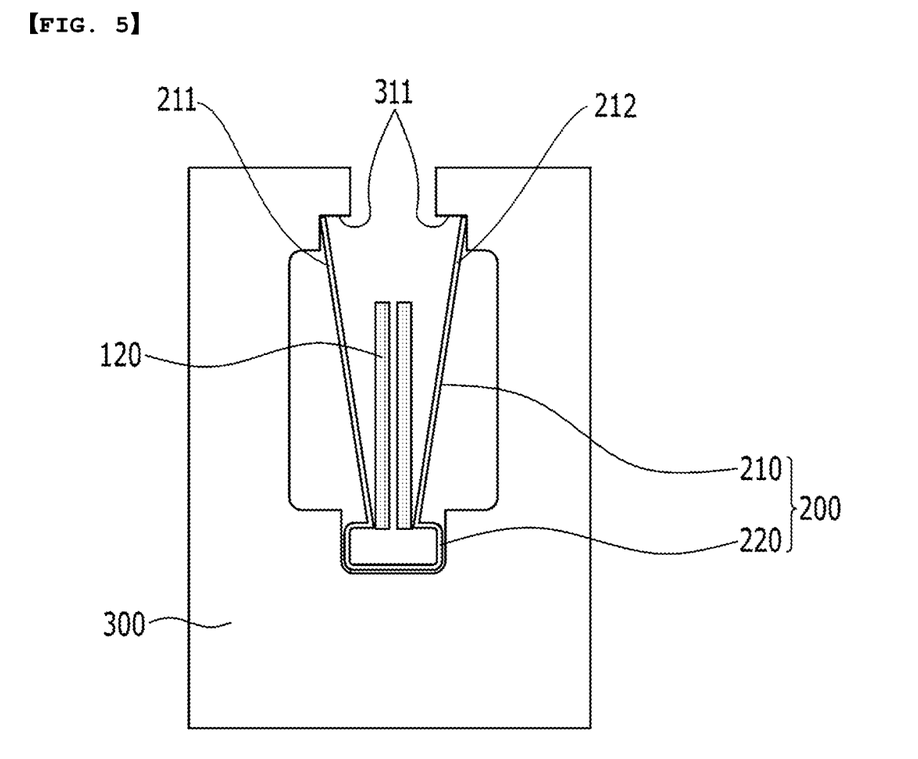
FIG. 5 is a cross-sectional view showing a state in which a busbar and an electrode lead are mounted in the busbar frame of FIG. 4.

FIG. 4 is a cross-sectional view of the busbar frame of FIG. 3 as viewed from the front. FIG. 5 is a cross-sectional view showing a state in which the busbar and the electrode lead are mounted in the busbar frame of FIG. 4.

Referring to FIG. 4, a structure of the busbar frame 300 according to an embodiment of the present invention has an opening part 310 formed by partially opening an upper end. The opening part 310 includes a locking part 311 defining a stepped shape with reference the entrance of the opening part 310 at the upper portion thereof. Busbar frame 300 may further include a lower opening part 312 that is recessed downwardly from the central portion of the opening part. 320 at the lower portion thereof as best shown in FIG. 4.

Referring to FIG. 5, the busbar 200 according to the present embodiment includes a tongs part 210 formed to receive the inserted electrode leads 120 therein, and a fixing part 220 for connecting and fixing the tongs part 210 to busbar frame 300.

The tongs part 210 may be formed of two clip parts 211 and 212 respectively extending from the fixing part 220 in an upward diagonal direction. When the electrode leads 120 are inserted, the electrode leads 120 may contact the inner surfaces of the two clip parts 211 and 212 as shown, for example, in FIG. 5.

The fixing part 220 may serve to connect and fix the tongs part 210 at the lower side thereof. The fixing part 220 is connected to the lower ends of the two clip parts 211 and 212. According to an embodiment of the present invention, the fixing part 220 can be formed to have a downward curvature from the tongs part 210, to allow electrode leads 120 to be easily inserted into the tongs part 210 while preventing elastic deformation or movement of the tongs part 210 to ensure proper fixation of tongs part 210.

The busbar 200 as described above may be mounted in the opening part 310 formed in the busbar frame 300 provided on one side of the battery cell stack. In this embodiment, the upper end of the tongs part 210 is positioned in the locking part 311 of the busbar frame 300, and the fixing part 220 is positioned in the lower opening part 312 of the busbar frame 300 as best shown in FIG. 5.

The locking parts 311 are formed to be recessed on either side of the opening part 310. The upper ends of the clip parts 211 and 212 on both sides of the tongs part 210 may be locked with the corresponding recess of locking part 311 and be mounted thereon. This ensures proper support for the busbar 200 to remain firmly secured to busbar frame 300.

The lower opening part 312 is formed to correspond to a structure in which the busbar frame 300 is recessed in a downward direction, and the fixing part 220 may be inserted and mounted to support the busbar 200 from the lower side so as not to move.

As a result, the busbar frame 300 may support the tongs part 210 of the busbar 200 from the upper left and right, respectively, while supporting the fixing parts 220 of the busbar from the lower center as shown in FIG. 5.

According to an embodiment of the present invention, the tongs part 210 and fixing part 220 of the busbar 200 can be formed in the shape of a bent plate-like clip having a minimum width enough to be in contact with a flat surface of the electrode leads 120, whereby the unnecessary volume of the conventional busbar structure is reduced. Therefore, a lighter busbar device can be mounted on the battery module.

The electrode leads 120 are electrically connected to the busbar 200, and for this purpose, the contact between the electrode leads 120 and the busbar 200 is required. According to one embodiment of the present invention, the electrode leads 120 are formed to be stacked horizontally in the shape of a flat plate and to protrude from each of the plurality of battery cells 100. The electrode leads 120 protruding in this way can be inserted into the tongs part 210 of the busbar 200. This can then be contacted and fixed by the left and right clip parts 211 and 212 to be electrically connected with the busbar 200.

The upper side of the busbar frame 300 is an open structure, and is formed so that the electrode leads 120 are easily inserted into the busbar frame 300. The tongs part 210 of the busbar 200 mounted inside the busbar frame 300 is also formed such that the upper side is open. Therefore, the electrode leads 120 can be easily inserted into the tongs part 210 of the busbar 200 and mounted therein by using the upper opening structure of the busbar frame 300.

The distance between the two clip parts 211 and 212 may decrease toward the lower fixing part 220 based on the distance between both upper ends of the clip parts 211 and 212. Therefore, the electrode leads 120 inserted from the upper side of the busbar 200 may be inserted downward along an insertion space formed by the two clip parts 211 and 212 of the tongs part 210, and the distance between the two clip parts 211 and 212 may decrease as it goes downward.

Therefore, the electrode leads 120 may be in contact with a portion between the two clip parts 211 and 212 formed closer to the fixing part 220, and not with the upper end of the two clip parts. More specifically, the flat surfaces of the electrode leads 120 correspond to the opposite surfaces of the two clip parts 211 and 212, and as a result, the tongs part 210 of the busbar 200 may be in close contact with the flat surface of the electrode leads 120 in a vertical direction.

According to an embodiment of the present disclosure, the contact position between electrode leads 120 and two clip parts 211,212 can be varied by varying distances between the ends of locking part 311 and clip parts 211, 212. For example, narrower distances between the locking parts 311 positioned at both upper ends of the busbar frame 300, and narrower distances between the two clip portions 211, 212, may move contact position between the electrode leads 120 and the two clip parts 211 and 212 upward.

According to an embodiment of the present invention, in order to maintain continuous close contact between the electrode leads 120 and the tongs part 210 of the busbar, the contact between the two components can be made by welding adhesion.

When the electrode leads 120 are formed to protrude in the shape of a flat plate and are inserted and mounted in the clip-shaped busbar composed of the tongs part and the fixing part, as in the embodiment of the present invention, there is no need to bend the electrode leads 120. Thus, the automation rate of the process can be improved. Further, there is no concern about the spring back phenomenon of bending which improves reliability of the electrical connection between the electrode leads and the busbar.

Figure 6:
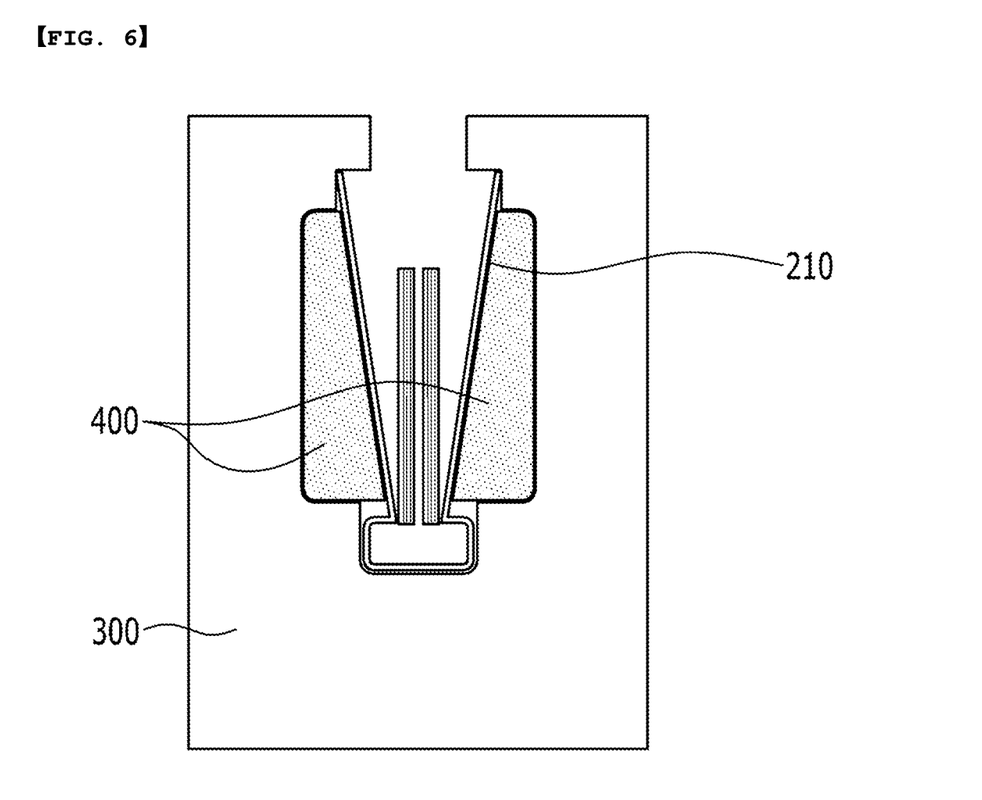
FIG. 6 is a cross-sectional view showing a state in which a jig is inserted into the busbar frame of FIG. 5 to closely adhere the busbar and the electrode lead.

FIG. 6 is a cross-sectional view showing a state in which a jig 400 is inserted into the busbar frame of FIG. 5 to closely adhere the busbar and the electrode lead.

Hereinafter, a method of manufacturing a battery module according to an embodiment of the present invention will be described with reference to FIGS. 2 to 6.

First, a busbar 200 is mounted on an opening part 310 of a busbar frame 300. A tongs part 210 of the busbar 200 may be secured to a locking part 311 formed on both sides of the upper opening part of the busbar frame 300, and a fixing part 220 of the busbar 200 may be mounted on the lower opening part of the busbar frame 300. In this embodiment, the mounting of the busbar 200 may be made through jig 400.

After the busbar 200 is mounted on the busbar frame 300, the electrode leads 120 are inserted between the tongs 210 of the busbar 200. Accordingly, the electrode leads 120 may be electrically connected to the busbar 200 on both sides.

After the electrode lead 120 is inserted between the tongs 210 of the busbar 200, the busbar 200 and the electrode leads 120 are brought into close contact through the jig. As shown in FIG. 6, the is inserted into the space between the busbar frame 300 and the busbar 200, so that the busbar 200 and the electrode lead 120 can be in close contact. By closely adhering the busbar 200 and the electrode leads 120, the reliability of the electrical connection between them can be secured.

After the busbar 200 and the electrode leads 120 are brought into close contact through the jig 400, the jig 400 may be removed from the battery module.

Although the present invention has been shown and described with reference to the preferred embodiments, the scope of the present disclosure is not limited thereto. Numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS AND SYMBOLS

100: battery cell
110: cell terrace
120: electrode lead
200: busbar
210: tongs part
211: first clip part
212: second clip part
220: fixing part
300: busbar frame
310: opening part
311: locking part
312: lower opening part
400: jig

The invention claimed is:

1. A battery module comprising:
a battery cell stack including a plurality of stacked battery cells;
electrode leads protruding from the battery cell stack;
a busbar electrically connected to the electrode leads; and
a busbar frame, the busbar mounted to the busbar frame,
wherein the busbar includes a tongs part and a fixing part,
wherein the electrode leads are positioned between the tongs part of the busbar, the tongs part includes first and second clip parts extending from the fixing part, and
wherein the busbar frame includes an opening part, a locking part formed on a first side of the opening part to enable a first end of the tongs part to be positioned thereto, and a lower opening part formed at a second side of the opening part to receive and position the fixing part, wherein the fixing part contacts and secures a first end of the electrode leads, a first distance between the electrode leads and the first clip part and a second distance between the electrode leads and the second clip part increase along an extension direction of the electrode leads from the fixing part,
wherein the fixing part is received within a recess of the lower opening part to secure the fixing part to the lower opening part.

2. The battery module of claim 1, wherein the first end of the tongs part is secured to a step of the locking part to prevent pullout of the tongs part from the busbar frame, the step being located on the first side of the opening part.

3. The battery module of claim 1, wherein the locking part includes first and second locking surfaces on opposite sides of a center of the opening part, the first end of the tongs part including upper ends of the first and second clip part, the first and second locking surfaces contacting the upper ends of the first and second clip part, respectively, to mount and secure the tongs part to the locking part.

4. The battery module of claim 1, wherein the electrode leads contact the first and second clip parts adjacent the fixing part and away from the locking part.

5. The battery module of claim 1, wherein the protruding electrode leads define a flat plate.

6. The battery module of claim 5, further including cell terraces protruding from battery cells adjacent to each other, the electrode leads extending from the cell terraces.

7. The battery module of claim 6, wherein the tongs part of the busbar is in contact with a flat surface of the electrode leads, the flat surface extending in a vertical direction between the fixing part and the locking part.

8. A method for manufacturing a battery module comprising the steps of:
placing a busbar in an opening part of a busbar frame;
inserting one or more electrode leads between a tongs part of the busbar;
adhering the busbar to the one or more electrode leads through a jig, and
removing the jig,
wherein the busbar is mounted to a busbar frame, the busbar including a fixing part, the tongs part including first and second clip parts extending from the fixing part, and
wherein the busbar frame includes an opening part, a locking part formed on a first side of the opening part to enable a first end of the tongs part to be positioned thereto, and a lower opening part formed at a second side of the opening part to receive and position the fixing part, wherein the fixing part contacts and secures a first end of the electrode leads, a first distance between the electrode leads and the first clip part and a second distance between the electrode leads and the second clip part increase along an extension direction of the electrode leads from the fixing part.

9. The method of claim 8, wherein the step of adhering the busbar to the one or more electrode leads through a jig includes the step of inserting the jig between the busbar frame and the busbar to adhere the busbar to the electrode leads.

\* \* \* \* \*